US009361721B2

(12) United States Patent
Muninder et al.

(10) Patent No.: US 9,361,721 B2
(45) Date of Patent: Jun. 7, 2016

(54) METHOD AND APPARATUS FOR IMAGE STITCHING

(71) Applicant: Nokia Corporation, Espoo (FI)

(72) Inventors: Veldandi Muninder, Bangalore (IN); S V Basavaraja, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 228 days.

(21) Appl. No.: 14/359,053

(22) PCT Filed: Nov. 7, 2012

(86) PCT No.: PCT/FI2012/051088
§ 371 (c)(1),
(2) Date: May 16, 2014

(87) PCT Pub. No.: WO2013/079776
PCT Pub. Date: Jun. 6, 2013

(65) Prior Publication Data
US 2014/0314325 A1  Oct. 23, 2014

(30) Foreign Application Priority Data
Nov. 30, 2011 (IN) .......................... 4160/CHE/2011

(51) Int. Cl.
*G06T 11/60* (2006.01)
*G06K 9/46* (2006.01)
*G06T 7/00* (2006.01)
*G06T 3/40* (2006.01)

(52) U.S. Cl.
CPC .............. *G06T 11/60* (2013.01); *G06K 9/4638* (2013.01); *G06T 3/4038* (2013.01); *G06T 7/0085* (2013.01)

(58) Field of Classification Search
CPC combination set(s) only.
See application file for complete search history.

(56) References Cited

U.S. PATENT DOCUMENTS

| 6,411,742 | B1 * | 6/2002 | Peterson | ............... G06T 7/0024 345/629 |
| 2010/0027876 | A1 | 2/2010 | Avidan et al. | |
| 2010/0246976 | A1 * | 9/2010 | Tolstaya | ............... H04N 1/3876 382/218 |

OTHER PUBLICATIONS

Xiong et al., "Fast Image Stitching and Editing for Panorama Painting on Mobile Phones", IEEE Computer Society Conference on Computer Vision and Pattern Recognition Workshops, Jun. 13-18, 2010, 6 Pages.
Avidan et al., "Seam Carving for Content-Aware Image Resizing", ACM Transactions on Graphics, vol. 26, Issue No. 3, Article No. 10, Jul. 2007, pp. 1-10.

(Continued)

*Primary Examiner* — Utpal Shah
*Assistant Examiner* — Kate R Duffy
(74) *Attorney, Agent, or Firm* — Nokia Technologies Oy (57) ABSTRACT

Various methods are provided for processing images. One example method may include computing a starting point and an ending point for an image seam as defined by an intersection of a rectangle bounding a first image and a rectangle bounding a second image. The method may also include determining whether the starting point and the ending point for the image seam are final points based on a determined mask region. The method may also include refining the starting point and the ending point by using an intersection of a mask image of the first image and a mask image of the second image in an instance in which it is determined that the starting point and the ending point are not final points. The method may also include computing a seam direction and one or more seam points using the starting point and the ending point.

20 Claims, 7 Drawing Sheets

(56) References Cited

OTHER PUBLICATIONS

Brown et al., "Automatic Panoramic Image Stitching Using Invariant Features", International Journal of Computer Vision, vol. 74, Issue 1, Aug. 2007, 16 Pages.

International Search Report and Written Opinion received for corresponding Patent Cooperation Treaty Application No. PCT/IB2010/054033, dated Dec. 21, 2010, 13 pages.

Yang Y. et al. "An Algorithm for Remote Sensing Image Mosaic Based on Valid Area", 2011 International Symposium on Image and Data Fusion (ISIDF), IEEE Proceedings Aug. 9, 2011.

Pulli K. et al. "Mobile Panoramic Imagining System", 2010 IEEE Computer Society Conference on Computer Vision and pattern Recognition Workshops (CVPRW), IEEE Proceedings 201-06-13, pp. 108-115.

\* cited by examiner

METHOD AND APPARATUS FOR IMAGE STITCHING

RELATED APPLICATION

This application was originally filed as PCT Application No. PCT/FI2012/051088 filed Nov. 7, 2012, which claims priority benefit from Indian Patent Application No. 4160/CHE/2011, filed Nov. 30, 2011.

TECHNOLOGICAL FIELD

Embodiments of the present invention relate generally to image processing and, more particularly, relate to a method, apparatus, and computer program product for stitching and/or blending multiple images.

BACKGROUND

Image stitching or photo stitching is the process of combining multiple photographic images with overlapping fields of view to produce a segmented panorama or high-resolution image. Image stitching in two dimensions is generally accomplished by constraining the capturing of an image. A seam may then be computed between the constrained images by remembering the position of the image and accordingly computing the seam. However these previous methods fail when the overlap between images is arbitrary and they also fail to account for various transformations and panoramic image creation.

BRIEF SUMMARY

A method, apparatus and computer program product are therefore provided according to an example embodiment of the present invention to provide a multidimensional seam computation method that is configured to handle arbitrary overlaps of multiple images. In some example embodiments, each image may be represented by a bounded rectangle and/or a mask region. The images and mask images may then be used to determine an image seam. The starting points and the ending points of the image seam are defined by the intersection between the two rectangles bounding the images. The starting and ending points of the image seam then may be refined based on the determined mask images and the predetermined boundary conditions. In some example embodiments, the seam direction and seam points are then computed to enable the stitching of multiple images.

In one embodiment, a method is provided that comprises computing a starting point and an ending point for an image seam as defined by an intersection of a rectangle bounding a first image and a rectangle bounding a second image. In some example embodiments, the seam defines an intersection of one or more feature points in the first image and one or more feature points in the second image. The method of this embodiment may also include determining whether the starting point and the ending point for the image seam are final points based on a determined mask region. The method of this embodiment may also include refining the starting point and the ending point by using an intersection of a mask image of the first image and a mask image of the second image in an instance in which it is determined that the starting point and the ending point are not final points. The method of this embodiment may also include computing a seam direction and one or more seam points using the starting point and the ending point.

In another embodiment, an apparatus is provided that includes at least one processor and at least one memory including computer program code with the at least one memory and the computer program code being configured, with the at least one processor, to cause the apparatus to at least compute a starting point and an ending point for an image seam as defined by an intersection of a rectangle bounding a first image and a rectangle bounding a second image. In some example embodiments, the seam defines an intersection of one or more feature points in the first image and one or more feature points in the second image. The at least one memory and computer program code may also be configured to, with the at least one processor, cause the apparatus to determine whether the starting point and the ending point for the image seam are final points based on a determined mask region. The at least one memory and computer program code may also be configured to, with the at least one processor, cause the apparatus to refine the starting point and the ending point by using an intersection of a mask image of the first image and a mask image of the second image in an instance in which it is determined that the starting point and the ending point are not final points. The at least one memory and computer program code may also be configured to, with the at least one processor, cause the apparatus to compute a seam direction and one or more seam points using the starting point and the ending point.

In the further embodiment, a computer program product may be provided that includes at least one non-transitory computer-readable storage medium having computer-readable program instruction stored therein with the computer-readable program instructions including program instructions configured to compute a starting point and an ending point for an image seam as defined by an intersection of a rectangle bounding a first image and a rectangle bounding a second image. In some example embodiments, the seam defines an intersection of one or more feature points in the first image and one or more feature points in the second image. The computer-readable program instructions may also include program instructions configured to determine whether the starting point and the ending point for the image seam are final points based on a determined mask region. The computer-readable program instructions may also include program instructions configured to refine the starting point and the ending point by using an intersection of a mask image of the first image and a mask image of the second image in an instance in which it is determined that the starting point and the ending point are not final points. The computer-readable program instructions may also include program instructions configured to compute a seam direction and one or more seam points using the starting point and the ending point.

In yet another embodiment, an apparatus is provided that includes means for computing a starting point and an ending point for an image seam as defined by an intersection of a rectangle bounding a first image and a rectangle bounding a second image. In some example embodiments, the seam defines an intersection of one or more feature points in the first image and one or more feature points in the second image. The apparatus of this embodiment may also include means for determining whether the starting point and the ending point for the image seam are final points based on a determined mask region. The apparatus of this embodiment may also include means for refining the starting point and the ending point by using an intersection of a mask image of the first image and a mask image of the second image in an instance in which it is determined that the starting point and the ending point are not final points. The apparatus of this embodiment may also include means for computing a seam direction and one or more seam points using the starting point and the ending point.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

Figure 1:
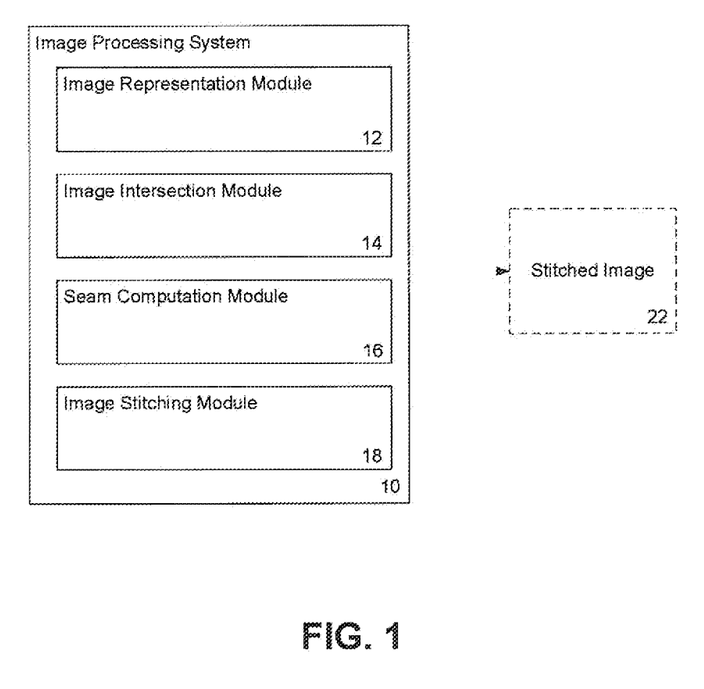
FIG. 1 is a schematic representation of an example image processing system in accordance with an embodiment of the present invention.

FIG. 1 is a schematic representation of an example image processing system 10 in accordance with an embodiment of the present invention. In particular the image processing system 10 may be configured to receive one or more images (e.g. video segments, photographs and/or the like). The images may be received by for example, a mobile telephone, portable digital assistant (PDA), pager, laptop computer, camera, camcorder, or any of numerous other hand held or portable communication devices, computation devices, content generation devices, content consumption devices, or any other device configured to capture an image. Once received, the images may be represented by a bounded rectangle. A binary mask for the bounded rectangle may also be determined. Once bounded by a rectangle, the image processing system 10 may determine an overlap area between the rectangles surrounding two images. Using the overlap area defined by the rectangles bounding the images, the image processing system 10 is further configured to determine a seam line between the two or more images. The image processing system 10 may then cause the images to be stitched together to form a panoramic image.

The image processing system 10 may include an image representation module 12, an image intersection module 14, a seam computation module 16 and/or an image stitching module 18. The example image representation module 12 is configured to cause an image to be represented by a bounded rectangle and/or a mask region. In some example embodiments a received image is bounded by a rectangle I'(x,y) of size h×w (e.g. h×w—h refers to height and w—refers to width). In an instance in which the image I2(x,y) is warped (e.g. bent, twisted, crooked or otherwise not aligned with the other image or a defined plane), then the warped image may be represented by its bounding rectangle image I2'(x,y) of size h×w. See e.g. FIG. 4. A binary mask image M may also be created.

The image representation module 12 may also determine whether a pixel in a mask is valid or invalid. For example, M(x,y) mentions whether the pixel location (x,y) in I2'(x,y) is valid or not. Therefore a valid pixel may be defined as M(x,y)=1; and an invalid pixel may be defined as M(x,y)=0. In some example embodiments, a valid pixel may be a pixel that is within an area defined by a bounded rectangle of the image.

In some example embodiments, the image intersection module 14 may be configured to compute intersecting points between two images and to determine an overlap region between the images. For example, let images (I1 and I2) of size h1×w1 be the two images to be stitched together. In some example embodiments, M1 may be the mask image of I1 and all pixels of M1 may be initialized to 1. The image intersection module 14 may then compute a registration matrix between the two images. The registration matrix may be computed based on, but not limited to, methods such as corner detection, scale-invariant feature transform (SIFT) feature detection or the like. Such methods allow for feature points in the two images to be determined. For example, determined feature points that are the same in both images may be mapped between the two images. Alternatively or additionally, a 3×3 homography matrix (registration matrix H), is estimated by using, for example, an above corners method and/or by using Random Sample Consensus (RANSAC) method. See e.g. FIG. 3. The image I2 may then be warped using matrix H and is enclosed in a bounding rectangle to form I2' of size h2×w2, thus resulting in image 2 being generally aligned with image 1. See e.g. FIG. 5. Similarly a Mask image M2' of size h2×w2 is formed to denote valid pixels of I2'.

In some example embodiments, the image intersection module 14 may be configured to determine an initial starting point and ending point for the image seam based on the intersection points for rectangle images I1 and I2'. For example, the intersection point in the bottom row of the overlap rectangle is taken as starting point (Sx,Sy) and the top row is taken as ending point (Ex,Ey). See for example starting and ending points 602 of FIG. 6.

In some example embodiments the image intersection module 14 may be configured to determine an overlap region and an overlap mask computation. The example overlap region between the images may be determined by using the computed intersection of the bounded rectangles. A binary mask for the determined overlap region may be computed using M12(x,y)=M1(x,y)*M2'(x,y) where (x,y) belongs to overlap region and M12(x,y) is the binary mask for overlap region. Finally, an overlap region difference image may be computed using I12(x,y)=(I1(x,y)−I2'(x,y))^2. Alternatively or additionally, in some example embodiments, the overlap mask may be pruned to remove columns and rows that do not contain a valid pixel.

Figure 6:
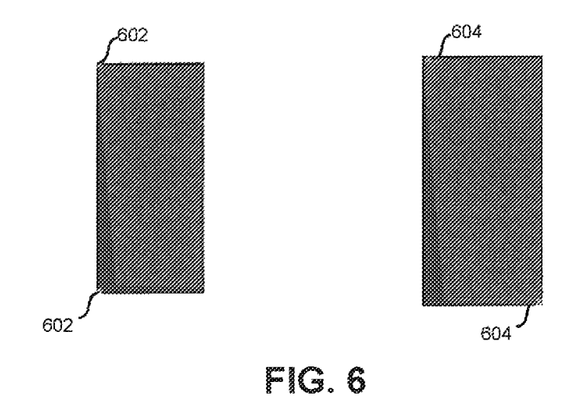

In some example embodiments, the seam computation module 16 may be configured to determine whether the starting point and the ending points as computed by the image intersection module are the valid starting and ending points for the image seam. The starting and ending points are valid in an instance in which they are located in a valid mask region. For example, the starting and ending points would be valid in an instance in which M12 (Sx,Sy)=1 & M12(Ex,Ey)=1. For example ending point 602 of FIG. 6 is not a valid point because it is not within a valid mask region. Alternatively or additionally, one rectangle bounding an image may be inside another rectangle that bounds a second image which may result in 3 or more valid intersection points. In the case of three or more valid points, two maximally distant valid points may be chosen by the seam computation module 16.

In an instance in which a starting point and/or ending point is invalid (e.g. M12(Sx,Sy)=0) then a new starting point may be computed by the seam computation module 16. In order to determine a new starting point, the seam computation module 16 may start from (Sx,Sy) and traverse row wise and column wise until two valid points can be determined. For example, if M12(Sx,Sy+dy)==1, then Sx'=Sx and Sy'=Sy+dy; and if M12(Sx+dx,Sy)==1, then Sx'=Sx+dy and Sy'=Sy then that point is a valid starting or ending point.

Once a new starting point and/or ending point are determined, then the seam computation module 16 may determine whether the determined point satisfies a boundary condition. By way of example, valid starting and ending points are located on the boundary of the intersecting mask images. For example, a point (Sx',Sy') satisfies the boundary condition if it satisfies one or more conditions for both images, for example if at least one of eight neighbors of (Sx',Sy') is zero in the Mask Images M1(Sx'+dx,Sy'+dy)=0−1<=dx<=1; −1<=dy<=1; is satisfied at least once; and/or if at least one of eight neighbors of (Sx',Sy') exceeds the bounds of rectangle image I1 and I2'.

In some example embodiments, the seam computation module 16 may be configured to compute image seam using the determined overlap region and the final starting and ending points. For example to determine the image seam and starting with the final starting point, in an instance in which (Sx1−Ex1)<(Sy1−Ey1) a horizontal seam is computed otherwise a vertical seam is computed. This continues until the seam reaches the final ending point. Given the seam direction, starting and ending points, the seam computation is performed by using dynamic programming on the error surface region of I12(x,y).

In some example embodiments, the path between the starting and ending point is computed by considering the overlap region error surface and the minimum cost path between starting and ending points. For example, if d(x,y) is the cost at a pixel location (equal to I12(x,y)) in the overlap region, a cumulative distance matrix D(x,y) is computed starting from (Sx,Sy) and ending at (Ex,Ey). The Distance matrix D(x,y) may be computed by using the formula D(x,y)=d(x,y)+min (D(x−1,y−1), D(x−1,y), D(x−1,y)) where in the border row distances are initialized to overlap region values. The final path may then computed by starting at (Ex,Ey) which has a cost of D(Ex,Ey) and traversing down to the starting point (Sx,Sy).

In some example embodiments, the image stitching module 18 may be configured to stitch together two images to form stitched image 22. See e.g. FIG. 8. Using the determined seam and the original images, Image labeling may be performed. Final stitching can be done by copying the respective pixels & blending is done to get final panorama image between I1 and I2'. A panoramic mask output image is also created which denotes the valid pixels in the panorama. This mask together with the output panoramic image can be used for stitching together additional related images.

Figure 2:
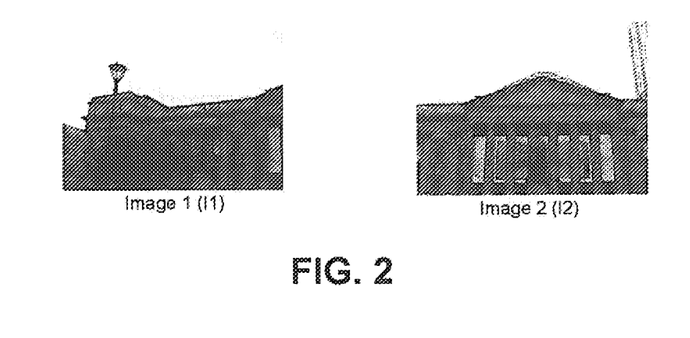
FIGS. 2-8 illustrate an example image stitching process as performed but the example image processing system according to an embodiment of the present invention.
Figure 3:
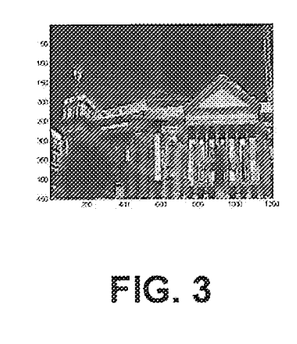

FIGS. 2-8 illustrate an example image stitching process as performed by the example image processing system according to an embodiment of the present invention. For example, FIG. 2 illustrates two images that were captured of a similar landmark that may be stitched together. As is shown with reference to FIG. 3, the systems and methods herein are then configured to compute feature points and determine a registration matrix using the RANSAC method. FIG. 3 shows the alignment of image2 warped using the registration matrix.

Figure 4:
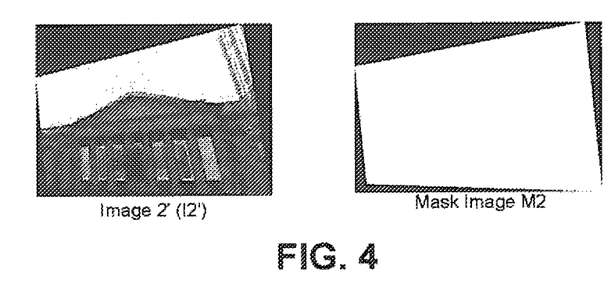
Figure 5:
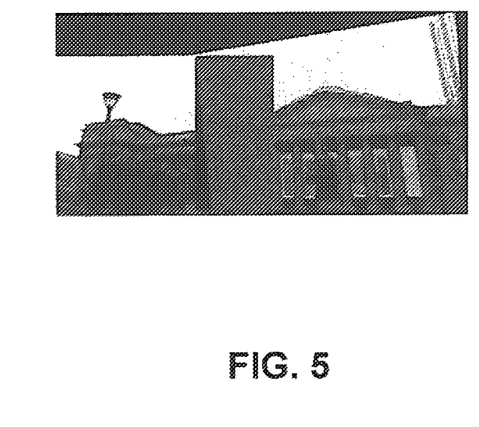
Figure 7:
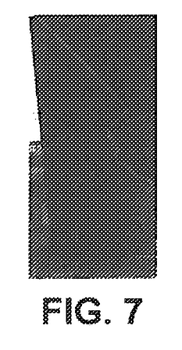
Figure 8:
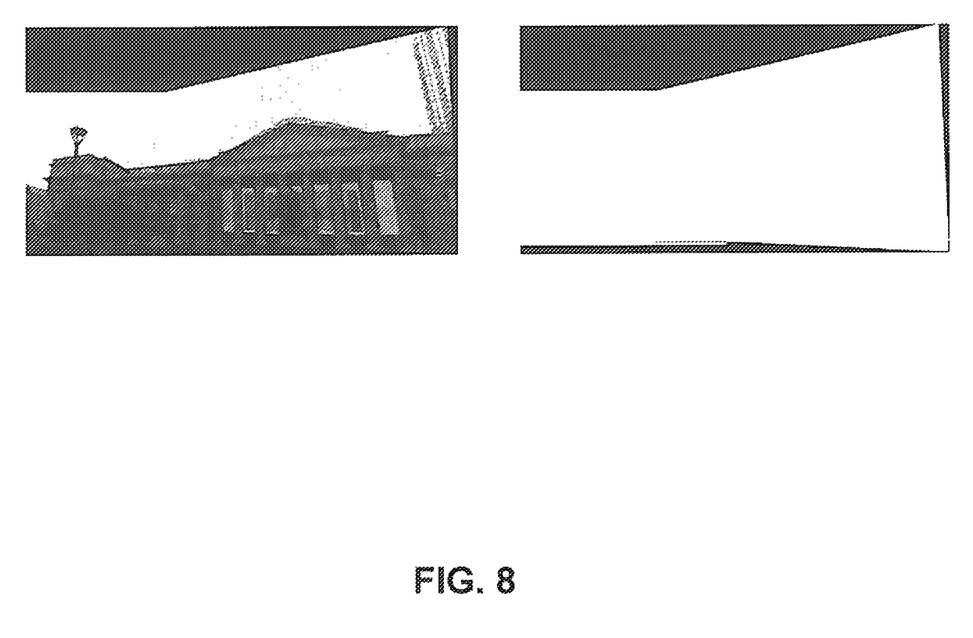

FIG. 4 illustrates an example image that is warped to match the alignment of a first image. A mask of the warped image is also created. FIG. 5 illustrates an overlapping region, overlapping mask region and the intersection points between images I1 and I2' are computed from the coordinates of I1 and I2. The mask of overlap region of FIG. 5 is computed by using the masks M1(x,y), M2(x,y). FIG. 6 illustrates a binary mask of the overlap area including starting points and ending points 602. If the starting point and ending point 602 do not contain a valid pixel, then the starting and ending points 602 are refined using the overlapped mask images. The final points 604 are selected because they are located in the mask region and they satisfy the boundary condition. FIG. 7 illustrates, using the final starting and ending points 604 of FIG. 6, a direction of seam is computed to be one of horizontal or vertical seam. Using the horizontal or vertical directions, a seam is computed. FIG. 8 illustrates example labeling and image copying into a panoramic image. Pixels of two images are labeled depending on the direction of the seam and the orientation of images with respect to each other. After labeling, corresponding pixels are copied to the panoramic image from respective images. Blending may be performed after the pixels are copied. Finally the output mask region is generated along with the output panorama. In some embodiments, and in an instance in which yet another image is added, the output panorama and mask image of FIG. 8 may serve as one input image and other camera captured image serves as other input. This way all the images are stitched by taking the stitched image as one of the inputs.

Figure 9:
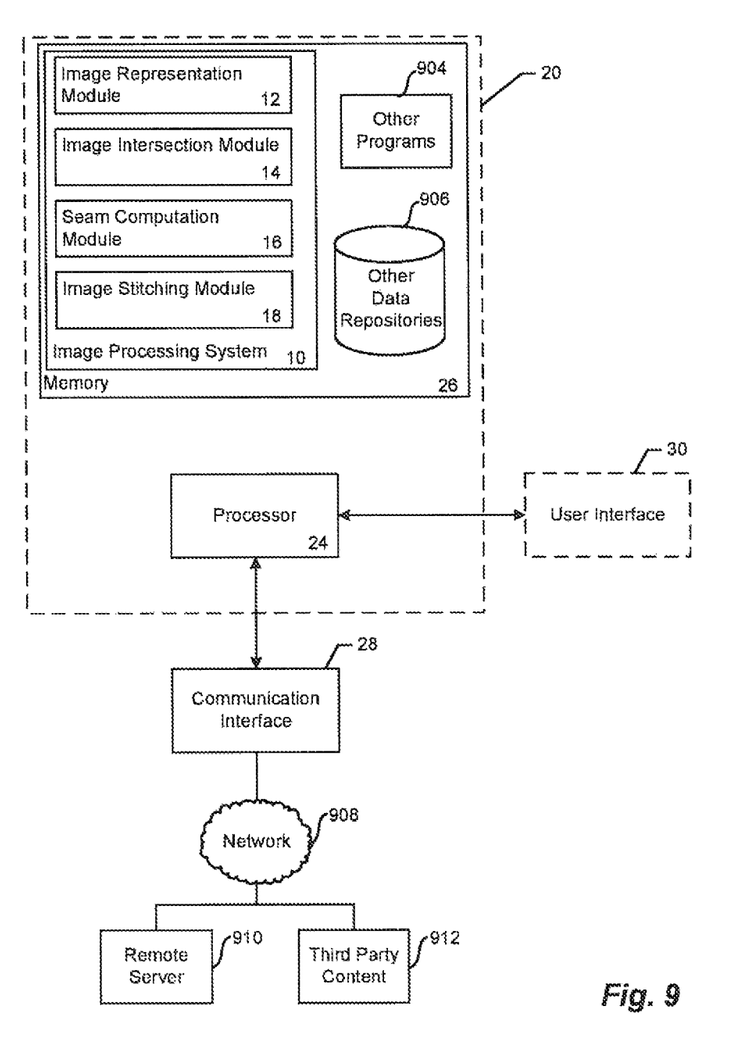
FIG. 9 is an example block diagram of an example computing device for practicing embodiments of an image processing system.

FIG. 9 is an example block diagram of an example computing device for practicing embodiments of an image processing system. In particular, FIG. 7 shows a system 20 that may be utilized to implement an image processing system 10. Note that one or more general purpose or special purpose computing systems/devices may be used to implement the image processing system 10. In addition, the system 20 may comprise one or more distinct computing systems/devices and may span distributed locations. Furthermore, each block shown may represent one or more such blocks as appropriate to a specific embodiment or may be combined with other blocks. For example, in some embodiments the system 20 may contain an image representation module 12, an image intersection module 14, a seam computation module 16 and/or an image stitching module 18. In other example embodiments, an image representation module 12, an image intersection module 14, a seam computation module 16 and/or an image stitching module 18 may be configured to operate on separate systems (e.g. a mobile terminal and a remote server, multiple remote servers and/or the like). For example, the an image representation module 12, an image intersection module 14, a seam computation module 16 and/or an image stitching module 18 may be configured to operate on a mobile terminal. Also, the image processing system 10 may be implemented in software, hardware, firmware, or in some combination to achieve the capabilities described herein.

While the system 20 may be employed, for example, by a mobile terminal, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In the embodiment shown, system 20 comprises a computer memory ("memory") 26, one or more processors 24 (e.g. processing circuitry) and a communications interface 28. The image processing system 10 is shown residing in memory 26. In other embodiments, some portion of the contents, some or all of the components of the image processing system 10 may be stored on and/or transmitted over other computer-readable media. The components of the image processing system 10 preferably execute on one or more processors 24 and are configured to stitch multidimensional images together. Other code or programs 904 (e.g., an administrative interface, a Web server, and the like) and potentially other data repositories, such as data repository 906, also reside in the memory 26, and preferably execute on processor 24. Of note, one or more of the components in FIG. 9 may not be present in any specific implementation.

In a typical embodiment, as described above, the image processing system 10 may include an image representation module 12, an image intersection module 14, a seam computation module 16 and/or an image stitching module 18. An image representation module 12, an image intersection module 14, a seam computation module 16 and/or an image stitching module 18 may perform functions such as those outlined in FIG. 1. The image processing system 10 may interact via the network 908 via a communications interface 28 with remote servers 910 and/or with third-party content 912. The network 908 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 28 may be capable of operating with one or more air interface standards, communication protocols, modulation types, access types, and/or the like. More particularly, the system 20, the communications interface 28 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the image processing system 10 may be implemented using standard programming techniques. For example, the image processing system 10 may be implemented as a "native" executable running on the processor 24, along with one or more static or dynamic libraries. In other embodiments, the image processing system 10 may be implemented as instructions processed by a virtual machine that executes as one of the other programs 904. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the image processing system 10, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the image processing system 10 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 10:
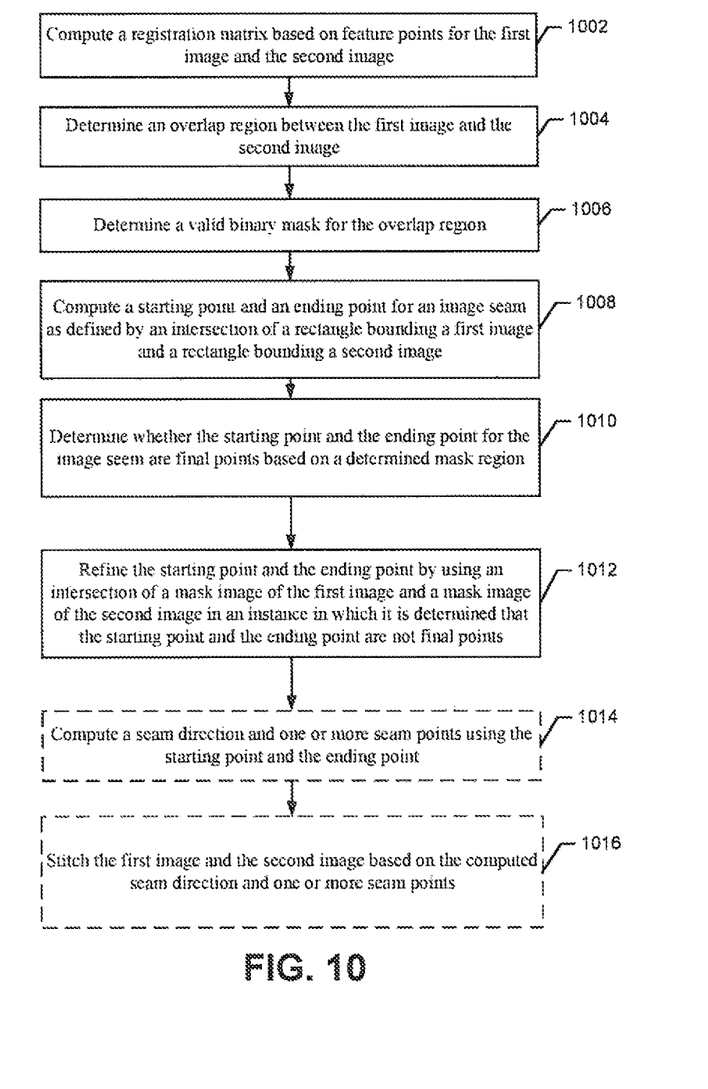
FIG. 10 is an example flowchart illustrating a method of operating an example image processing system performed in accordance with an embodiment of the present invention.

FIG. 10 illustrates an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 10, when executed, convert a computer or processing circuitry into a particular machine configured to perform an example embodiment of the present invention. Accordingly, the operations of FIG. 10 define an algorithm for configuring a computer or processing to perform an example embodiment. In some cases, a general purpose computer may be provided with an instance of the processor which performs the algorithms of FIG. 10 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 10 is an example flowchart illustrating a method of operating an example image processing system performed in accordance with an embodiment of the present invention. Once each image is imported into the system, as shown in operation 1002, the system 20 may include means, such as the image processing system 10, the image representation module 12, the processor 24 or the like for computing a registration matrix based on feature points for the first image and the second image. During the registration a warped imaged may be computed by as the image processing system 10, the image representation module 12, the processor 24 or the like. I2'(x, y) and M2(x,y) are computed using registration matrix (H).

As shown in operation 1004, the system 20 may include means, such as the image processing system 10, the image intersection module 14, the processor 24 or the like for determining an overlap region between the first image and the second image.

As shown in operation 1006, the system 20 may include means, such as the image processing system 10, the image intersection module 14, the processor 24 or the like for determining a valid binary mask for the overlap region. Such an overlap is computed, such as by the processor 24, by determining an intersection between the determined rectangles that bound the images. As shown in operation 1008, the system 20 may include means, such as the image processing system 10, the image intersection module 14, the processor

24 or the like for computing a starting point and an ending point for an image seam as defined by an intersection of a rectangle bounding a first image and a rectangle bounding a second image. In some example embodiments the seam defines an intersection of one or more feature points in the first image and one or more feature points in the second image.

As shown in operation 1010, the system 20 may include means, such as the image processing system 10, the image intersection module 14, the processor 24 or the like for determining whether the starting point and the ending point for the image seam are final points based on a determined mask region. The image processing system 10, the image intersection module 14, the processor 24 or the like may determine whether the starting point is located on a boundary of the rectangle bounding the first image and the rectangle bounding a second image. The image processing system 10, the image intersection module 14, the processor 24 or the like may refine the starting point using the predefined boundary condition in an instance in which the starting point is not located on the boundary of the rectangle bounding the first image and the rectangle bounding a second image. The image processing system 10, the image intersection module 14, the processor 24 or the like may determine whether the ending point is located on a boundary of the rectangle bounding the first image and the rectangle bounding the second image. The image processing system 10, the image intersection module 14, the processor 24 or the like may refine the ending point using the predefined boundary condition the ending point is not located on the boundary of the rectangle bounding the first image and the rectangle bounding a second image.

As shown in operation 1012, the system 20 may include means, such as the image processing system 10, the image intersection module 14, the processor 24 or the like for refining the starting point and the ending point by using an intersection of a mask image of the first image and a mask image of the second image in an instance in which it is determined that the starting point and the ending point are not final points.

As shown in operation 1014, the system 20 may include means, such as the image processing system 10, the seam computation module, the processor 24 or the like for computing a seam direction and one or more seam points using the starting point and the ending point. As shown in operation 1016, the system 20 may include means, such as the image processing system 10, the image stitching module 18, the processor 24 or the like for stitching the first image and the second image based on the computed seam direction and one or more seam points.

Advantageously, the systems and methods as described here are configured to handles arbitrary overlaps of multiple images and provides a solution to stitch them together using seam computation. Alternatively or additionally, using a unidirectional seam, the systems and methods as described herein are configured to output a panoramic image. For example, consider an Image Ip which is an intermediate panorama input image and image Is, which is an image to be stitched that overlaps Ip. Using the systems and methods as described herein starting and ending points may be the intersection of two images bounded by rectangles. However in an instance in which image Ip is the complete bounding rectangle which has non-valid pixels. Here the start and endpoints are four points, where 3 points are valid. Hence the maximal distant two diagonal points are taken as start and end point. Thus the seam connecting the points can be solved using a systems and methods described herein as the points are on the top row and bottom column.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
   computing a starting point and an ending point for an image seam as defined by an intersection of a rectangle bounding a first image and a rectangle bounding a second image, wherein the image seam defines an intersection of one or more feature points in the first image and one or more feature points in the second image;
   determining whether the starting point and the ending point for the image seam are final points based on a determined mask region;
   refining the starting point and the ending point by using an intersection of a mask image of the first image and a mask image of the second image in an instance in which it is determined that the starting point and the ending point are not final points; and
   computing a seam direction and one or more seam points using the starting point and the ending point.

2. A method according to claim 1, further comprising:
   determining whether the starting point is located on a boundary of the rectangle bounding the first image and the rectangle bounding a second image;
   refining the starting point using a predefined boundary condition in an instance in which the starting point is not located on the boundary of the rectangle bounding the first image and the rectangle bounding a second image;
   determining whether the ending point is located on a boundary of the rectangle bounding the first image and the rectangle bounding the second image; and
   refining the ending point using the predefined boundary condition the ending point is not located on the boundary of the rectangle bounding the first image and the rectangle bounding a second image.

3. A method according to claim 1, further comprising stitching the first image and the second image based on a computed seam direction and one or more computed seam points.

4. A method according to claim 1, further comprising refining the starting point and the ending point by selecting two maximally distant valid points in an instance in which a rectangle of an image is inside a rectangle of another image resulting in greater than two valid points.

5. A method according to claim 1, further comprising:
   computing a registration matrix based on feature points for the first image and the second image;
   determining an overlap region between the first image and the second image;

determining a valid binary mask for the overlap region; and causing the valid binary mask of the overlap region to be pruned, wherein the valid binary mask is pruned such that each column and row has at least one valid pixel.

6. A method according to claim 1, further comprising:

causing the first image to be represented by a bounded rectangle and a mask region; and causing the second image to be represented by a bounded rectangle and a mask region.

7. A method according to claim 1, further comprising causing the rectangle bounding the first image or the rectangle bounding a second image to be warped based on a transformation matrix.

8. An apparatus comprising:

at least one processor; and at least one memory including computer program code, the at least one memory and the computer program code configured to, with the at least one processor, cause the apparatus to at least:

compute a starting point and an ending point for an image seam as defined by an intersection of a rectangle bounding a first image and a rectangle bounding a second image, wherein the image seam defines an intersection of one or more feature points in the first image and one or more feature points in the second image;

determine whether the starting point and the ending point for the image seam are final points based on a determined mask region;

refine the starting point and the ending point by using an intersection of a mask image of the first image and a mask image of the second image in an instance in which it is determined that the starting point and the ending point are not final points; and compute a seam direction and one or more seam points using the starting point and the ending point.

9. An apparatus according to claim 8, wherein the at least one memory including the computer program code is further configured to, with the at least one processor, cause the apparatus to:

determine whether the starting point is located on a boundary of the rectangle bounding the first image and the rectangle bounding a second image;

refine the starting point using a predefined boundary condition in an instance in which the starting point is not located on the boundary of the rectangle bounding the first image and the rectangle bounding a second image;

determine whether the ending point is located on a boundary of the rectangle bounding the first image and the rectangle bounding the second image; and refine the ending point using the predefined boundary condition the ending point is not located on the boundary of the rectangle bounding the first image and the rectangle bounding a second image.

10. An apparatus according to claim 8, wherein the at least one memory including the computer program code is further configured to, with the at least one processor, cause the apparatus to stitch the first image and the second image based on a computed seam direction and one or more computed seam points.

11. An apparatus according to claim 8, wherein the at least one memory including the computer program code is further configured to, with the at least one processor, cause the apparatus to refine the starting point and the ending point by selecting two maximally distant valid points in an instance in which a rectangle of an image is inside a rectangle of another image resulting in greater than two valid points.

12. An apparatus according to claim 8, wherein the at least one memory including the computer program code is further configured to, with the at least one processor, cause the apparatus to:

compute a registration matrix based on feature points for the first image and the second image;

determine an overlap region between the first image and the second image;

determine a valid binary mask for the overlap region; and cause the valid binary mask of the overlap region to be pruned, wherein the valid binary mask is pruned such that each column and row has at least one valid pixel.

13. An apparatus according to claim 8, wherein the at least one memory including the computer program code is further configured to, with the at least one processor, cause the apparatus to:

cause the first image to be represented by a bounded rectangle and a mask region; and cause the second image to be represented by a bounded rectangle and a mask region.

14. An apparatus according to claim 8, wherein the at least one memory including the computer program code is further configured to, with the at least one processor, cause the apparatus to cause the rectangle bounding the first image or the rectangle bounding a second image to be warped based on a transformation matrix.

15. A computer program product comprising:

at least one computer readable non-transitory memory medium having program code stored thereon, the program code which when executed by an apparatus cause the apparatus at least to:

compute a starting point and an ending point for an image seam as defined by an intersection of a rectangle bounding a first image and a rectangle bounding a second image, wherein the image seam defines an intersection of one or more feature points in the first image and one or more feature points in the second image;

determine whether the starting point and the ending point for the image seam are final points based on a determined mask region;

refine the starting point and the ending point by using an intersection of a mask image of the first image and a mask image of the second image in an instance in which it is determined that the starting point and the ending point are not final points; and compute a seam direction and one or more seam points using the starting point and the ending point.

16. A computer program product according to claim 15, further comprising program code instructions configured to:

determine whether the starting point is located on a boundary of the rectangle bounding the first image and the rectangle bounding a second image;

refine the starting point using a predefined boundary condition in an instance in which the starting point is not located on the boundary of the rectangle bounding the first image and the rectangle bounding a second image;

determine whether the ending point is located on a boundary of the rectangle bounding the first image and the rectangle bounding the second image; and refine the ending point using the predefined boundary condition the ending point is not located on the boundary of the rectangle bounding the first image and the rectangle bounding a second image.

17. A computer program product according to claim 15, further comprising program code instructions configured to stitch the first image and the second image based on a computed seam direction and one or more computed seam points.

18. A computer program product according to claim 15, further comprising program code instructions configured to refine the starting point and the ending point by selecting two maximally distant valid points in an instance in which a rectangle of an image is inside a rectangle of another image resulting in greater than two valid points.

19. A computer program product according to claim 15, further comprising program code instructions configured to:
   compute a registration matrix based on feature points for the first image and the second image;
   determine an overlap region between the first image and the second image;
   determine a valid binary mask for the overlap region; and
   cause the valid binary mask of the overlap region to be pruned, wherein the valid binary mask is pruned such that each column and row has at least one valid pixel.

20. An apparatus comprising:
   means for computing a starting point and an ending point for an image seam as defined by an intersection of a rectangle bounding a first image and a rectangle bounding a second image, wherein the image seam defines an intersection of one or more feature points in the first image and one or more feature points in the second image;
   means for determining whether the starting point and the ending point for the image seam are final points based on a determined mask region;
   means for refining the starting point and the ending point by using an intersection of a mask image of the first image and a mask image of the second image in an instance in which it is determined that the starting point and the ending point are not final points; and
   means for computing a seam direction and one or more seam points using the starting point and the ending point.

* * * * *